US010153910B2

(12) United States Patent
Tu et al.

(10) Patent No.: US 10,153,910 B2
(45) Date of Patent: Dec. 11, 2018

(54) LOW POWER TWISTED PAIR CODING SCHEME

(71) Applicant: AVAGO TECHNOLOGIES INTERNATIONAL SALES PTE. LIMITED

(72) Inventors: Chung Ming Tu, Irvine, CA (US); Alan Kwentus, Coto de Caza, CA (US); William Calvin Woodruff, Pleasanton, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 173 days.

(21) Appl. No.: 14/603,055

(22) Filed: Jan. 22, 2015

(65) Prior Publication Data

US 2015/0207635 A1    Jul. 23, 2015

Related U.S. Application Data

(60) Provisional application No. 61/930,190, filed on Jan. 22, 2014.

(51) Int. Cl.
| H04B 1/04 | (2006.01) |
| H04L 12/12 | (2006.01) |
| H04L 1/00 | (2006.01) |
| H04B 3/32 | (2006.01) |

(52) U.S. Cl.
CPC .............. H04L 12/12 (2013.01); H04B 3/32 (2013.01); H04L 1/0002 (2013.01); H04L 1/0057 (2013.01); Y02D 50/40 (2018.01)

(58) Field of Classification Search
CPC ......................................................... H04B 1/04
See application file for complete search history.

(56) References Cited

U.S. PATENT DOCUMENTS

| 2004/0008794 A1* | 1/2004 | McClellan | H04L 1/006 375/260 |
| 2004/0131035 A1* | 7/2004 | Wakeley | H04W 88/02 370/338 |
| 2005/0149844 A1* | 7/2005 | Tran | H03M 13/1117 714/800 |
| 2006/0056521 A1* | 3/2006 | Parhi | H04L 25/03343 375/242 |

(Continued)

FOREIGN PATENT DOCUMENTS

WO    WO 2008060598 A2 *  5/2008   ............. H04L 12/66

*Primary Examiner* — Ayanah S George
(74) *Attorney, Agent, or Firm* — Xsensus LLP

(57) ABSTRACT

A transceiver, a communication system and an associated method thereof for reducing overall power consumption and complexity of the transceiver that operates over short reach twisted pair cables. The analog front end (AFE) of the transceiver communicates over at least one twisted pair that is configured only for transmission of data streams and communicates over at least one twisted pair that is only for reception of data streams. The transceiver includes circuitry that generates multiplexed and demultiplexed data streams for communication with the analog front end. Additionally, the transceiver utilizes at least certain portions of signal processing circuitry and AFE of a 10 GBASE-T transceiver or the like.

21 Claims, 5 Drawing Sheets

(56) References Cited

U.S. PATENT DOCUMENTS

| | | | |
|---|---|---|---|
| 2006/0159160 A1* | 7/2006 | Kim | H04B 7/0891 375/148 |
| 2007/0033484 A1* | 2/2007 | Kim | H03M 13/1111 714/758 |
| 2008/0212715 A1* | 9/2008 | Chang | H04L 25/061 375/317 |
| 2009/0154365 A1* | 6/2009 | Diab | H04L 1/0001 370/248 |
| 2010/0329669 A1* | 12/2010 | Cunningham | H04B 10/40 398/41 |

* cited by examiner

LOW POWER TWISTED PAIR CODING SCHEME

CROSS-REFERENCE TO RELATED APPLICATIONS

This application is based upon and claims the benefit of priority to provisional U.S. Application No. 61/930,190 entitled "Low Power Twisted Pair Coding Scheme" and filed Jan. 22, 2014. The entire contents of this provisional application are incorporated herein by reference.

FIELD

Exemplary embodiments of the present disclosure relate to reducing the overall power consumption and complexity of a transceiver. More specifically, the exemplary embodiments relate to a transceiver, a communication system and a method thereof for reducing the overall power consumption and complexity of the transceiver that operates over short reach twisted pair cables.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The existing 10 GBASE-T standard (IEEE 802.3an) provides 10 Gbits/sec Ethernet connections over shielded or unshielded twisted pair (TWP) copper cables. The standard includes four TWPs and is designed for cable lengths of up to 100 meters. The standard achieves a baud-rate of 800 MHz, wherein each TWP carries signals in both directions. Transceivers employing this standard are equipped with an analog front end (AFE) and digital filter circuitry that include, among other elements, four digital-to-analog converters, four analog-to-digital converters, four hybrids (i.e., impedance matching circuits), and four echo cancellers. However, for short reach cables of lengths up to 30 meters, such a transceiver design is inefficient in terms of power consumption and complexity.

SUMMARY

A transceiver, a communication system and an associated methodology for reducing overall power consumption and complexity of a transceiver that operates over short reach twisted pair cables, as set forth more completely in the claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
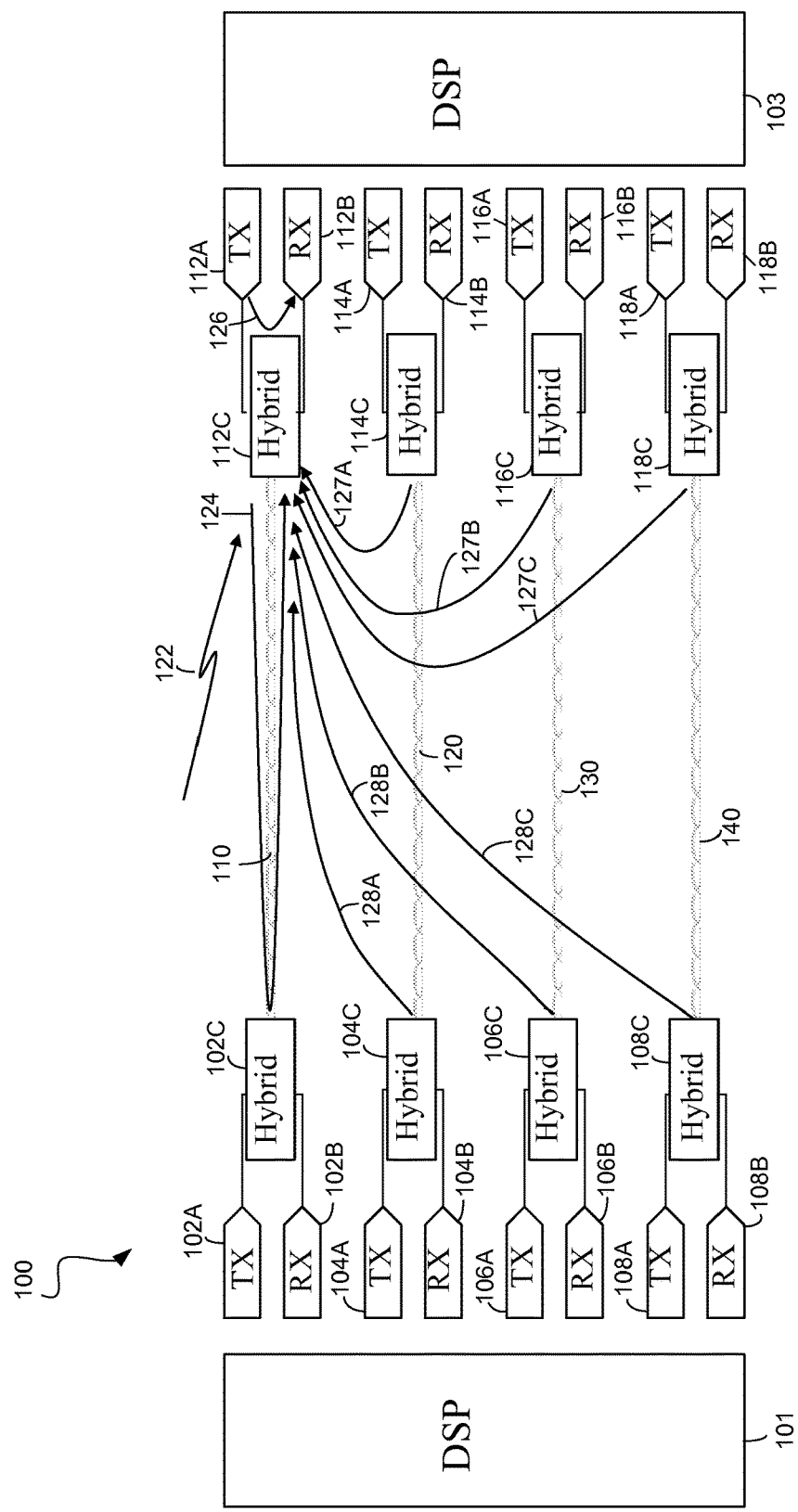
FIG. 1 depicts according to an embodiment, a first representative communication system.

The drawings illustrate only example embodiments and are therefore not to be considered limiting of the scope described herein, as other equally effective embodiments are within the scope and spirit of the present disclosure. The elements and features shown in the drawings are not necessarily drawn to scale, emphasis instead being placed upon clearly illustrating the principles of the embodiments. Additionally, certain dimensions or positioning's may be exaggerated to help visually convey certain principles.

DETAILED DESCRIPTION

In the following paragraphs, the embodiments are described in further detail by way of example with reference to the attached drawings. The described embodiments are not limited in application to the examples set forth herein.

An exemplary aspect of the present disclosure provides for a low-power communication transceiver. The transceiver includes an analog front end that is configured to communicate over at least one twisted pair that is only for transmitting data streams, and communicate over at least one twisted pair that is only for receiving data streams. The transceiver also includes circuitry that is configured to generate multiplexed and demultiplexed data streams for communication via the analog front end.

Another exemplary aspect of the disclosure provides for a communication system. The communication system includes a first transceiver and a second transceiver that are connected to each other by a short reach cable, which includes a plurality of twisted pairs. A first analog front end included in the first transceiver is configured to communicate with a second analog front end included in the second transceiver over at least one twisted pair that is only for transmitting data streams, and communicate over at least one twisted pair that is only for receiving data streams. The communication system further includes a first circuitry included in the first transceiver and a second circuitry included in the second transceiver, the first circuitry and the second circuitry are configured to generate multiplexed and demultiplexed data streams for communication via the first analog front end and the second analog front end, respectively.

In a further exemplary aspect, the present disclosure provides a method for reducing the overall power consumption and complexity of a transceiver that operates over a short reach cable. The method includes: communicating, by an analog front end, over at least one twisted pair that is only for transmitting data streams, and communicating over at least one twisted pair that is only for receiving data streams. Further, the method includes generating by circuitry, multiplexed and demultiplexed data streams for communication via the analog front end.

The 10 GBASE-T standard is designed for cable lengths of up to 100 meters. The standard includes four twisted pair (TWP) copper cables that each transmit signals in both directions and achieve a baud-rate (i.e., symbol rate) of 800 MHz. The baud-rate is defined herein as the number of distinct symbol changes made to the transmission medium per second for a digitally modulated signal or line code. A transceiver employing such a standard includes an analog front end (AFE) and a digital filter circuitry that includes at least four digital-to-analog converters, four analog-to-digital converters, four hybrid circuits, and four echo cancellers. Such a transceiver design results in high power consumption and increased circuit complexity for short reach TWP applications.

Accordingly, an embodiment of the present disclosure describes an approach that achieves high baud-rates while reducing the transceiver's power consumption and circuit complexity by configuring each TWP to transmit a signal in only one direction. Specifically, an embodiment of the disclosure provides for a line coding scheme, wherein out of the four TWPs, two TWPs are relied upon for transmission and two TWPs are relied upon for reception. Such a line coding scheme is referred to herein as a 2Tx-2Rx scheme that achieves a baud-rate of 1.6 GHz. The 2Tx-2Rx communication scheme can be implemented for short reach cables (of lengths up to 30 meters) of both, shielded and unshielded type. Additionally, the 2Tx-2Rx transceiver is capable of utilizing certain portions of the 10 GBASE-T transceiver. Furthermore, it must be appreciated that although a 10 GBASE-T encoding scheme is described in the present embodiment, other line coding schemes are also within the scope and spirit of the embodiments described herein.

Referring now to the drawings, wherein like reference numerals designate identical or corresponding parts throughout the several views, FIG. 1 depicts according to an embodiment, a first representative communication system 100.

The communication system 100 includes a first digital-signal processor (DSP) 101, and a second DSP 103 that communicate via a cable (shielded or unshielded) that includes four twisted pairs (TWP) 110, 120, 130, and 140, respectively. According to an embodiment, the cable may be of length up to 100 meters and the communication system 100 may be based on a 10 GBASE-T standard that achieves a baud-rate of 800 MHz.

Each TWP includes a transmitter, a receiver and a hybrid circuit (i.e., an impedance matching circuit) coupled at each end of the TWP. For instance, as shown in FIG. 1, the TWP 110 includes hybrid circuits 102C and 112C coupled at each end of the TWP. Further, a transmitter 102A and a receiver 102B are coupled to the hybrid circuit 102C, whereas a transmitter 112A and a receiver 112B are coupled to the hybrid circuit 112C. Thus, the TWP 110 is configured to transmit signals in both directions (i.e., from the first DSP 101 to the second DSP 103 and vice-versa). Similarly, the TWPs 120, 130 and 140 include the hybrid circuits 104C, 114C, 106C, 116C, 108C, and 118C respectively, which are coupled at each ends of the corresponding TWPs. The TWPs 120, 130 and 140 are also configured to transmit signals in both directions. Thus, as shown in FIG. 1, a pair of transmitter and receiver 104A, 104B, 106A, 106B, 108A, 108B, 114A, 114B, 116A, 116B, 118A and 118B are each coupled to the hybrid circuits 104C, 114C, 106C, 116C, 108C, and 118C respectively.

The communication system 100 experiences certain aspects of interferences including near-end echo, far-end echo, near-end-cross-talk, far-end-cross-talk, and other external radio interferences such as electromagnetic interference (EMI). For instance, FIG. 1 depicts the interferences experienced by the hybrid circuit 112C and the receiver 112B. As shown in FIG. 1, the hybrid circuit 112C experiences alien-near-end-cross-talk (i.e., environmental noise) 122, far-end echo 124, far-end crosstalk's 128A, 128B, and 128C from the hybrid circuits 104C, 106C, and 108C respectively, near-end crosstalk 127A, 127B, and 127C from the neighboring hybrid circuits 114C, 116C and 118C, respectively. Furthermore, the receiver 112B experiences near-end echo 126. The above described interference components interfere with the signals being transmitted on each TWP and thereby degrade the quality of communication.

Figure 2:
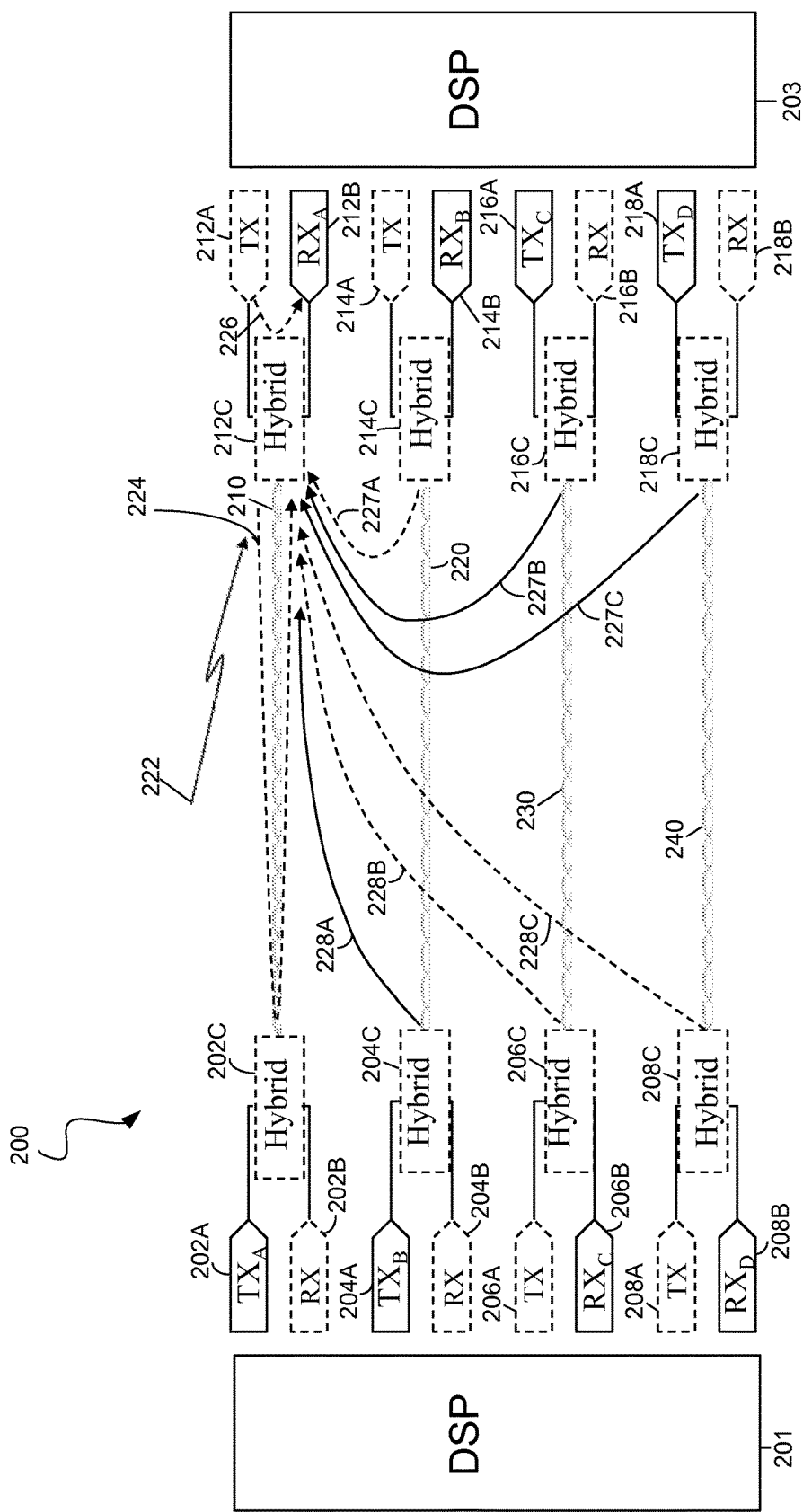
FIG. 2 illustrates according to another embodiment, a second representative communication system.

FIG. 2 illustrates according to another embodiment, a second representative communication system 200. The communication system 200 includes a first DSP 201 that communicates with a second DSP 203 via a cable (shielded or unshielded), which includes four twisted pairs (TWP) 210, 220, 230, and 240, respectively. According to one embodiment, the communication system 200 may be particularly well suited for short range shielded/unshielded TWP cable of about 30 meters in length and can achieve baud-rates of 1.6 GHz, although other baud-rates are well within the scope and spirit of the embodiments.

In contrast to the communication system 100 of FIG. 1, the communication system 200 of FIG. 2 uses two TWPs (210 and 220) only for transmission of signals from the first DSP to the second DSP, and two TWPs (230 and 240) only for transmission of signals from the second DSP to the first DSP. Thus, the TWPs 210, 220, 230 and 240 are configured to transmit signals only in one direction. The communication system of FIG. 2 is referred to herein as a two-transmitter two-receiver (2Tx-2Rx) communication system.

Specifically, as shown in FIG. 2, the TWP 210 is configured for transmitting signals from DSP 201 to DSP 203. A transmitter 202A and a receiver 212B are directly coupled to the TWP 210 at either ends, respectively. Thus, by configuring the TWP 210 to transmit signals only in one direction provisions for the exclusion of the following elements (represented by dotted boxes): receiver 202B, hybrid circuits 202C and 212C and transmitter 212A. Accordingly, the communication system 200 reduces the complexity of the hardware components used in the system. Similarly, by configuring the TWP 220 to transmit signals only from DSP 201 to DSP 203, provisions for the exclusion of the receiver 204B, hybrid circuits 204C and 214C, and transmitter 214A.

Furthermore, the TWPs 230 and 240 are configured to transmit signals only from the DSP 203 to DSP 201. In doing so, the following elements (represented by dotted boxes): receivers 216B and 218B, hybrid circuits 216C, 218C, 206C, and 208C, and transmitters 206A and 208A, can be eliminated from the communication system 200, thereby leading to a reduced system complexity. Moreover, in contrast to the communication system 100 of FIG. 1, the communication system 200 does not require echo cancellers. Therefore, it must be appreciated that by configuring the TWPs to transmit signals only in one direction, the hardware complexity as well as the cost of the communication system 200 is considerably reduced as compared to the communication system 100 of FIG. 1.

Furthermore, according to one embodiment, the communication system 200 of FIG. 2 may be substantially embodied in a similar hardware configuration as that of the communication system 100 depicted in FIG. 1 with the exclusion of the above identified components. Additionally, the communication system 200 experiences fewer near-end and far-end interference components as compared to the communication system 100 of FIG. 1. For instance, as shown in FIG. 2, the receiver 212B that is coupled to TWP 210 experiences only near end crosstalk components 227B and 227C from neighboring transmitters 216A and 218A, and a minimal far-end crosstalk component 228A from transmitter 204A. By configuring the TWPs to transmit signals only in one direction, the following interference components (shown by dotted arcs) are eliminated from the communication system 200: near-end crosstalk 227A, far-end crosstalk components 228B and 228C, far-end echo 224, and near-end echo 226. Therefore, in contrast to the communication system of FIG. 1, the communication system of FIG. 2 reduces the number of interference components significantly by configuring the TWPs to transmit signals only in one direction and thus achieves a better quality of communication.

Figure 3:
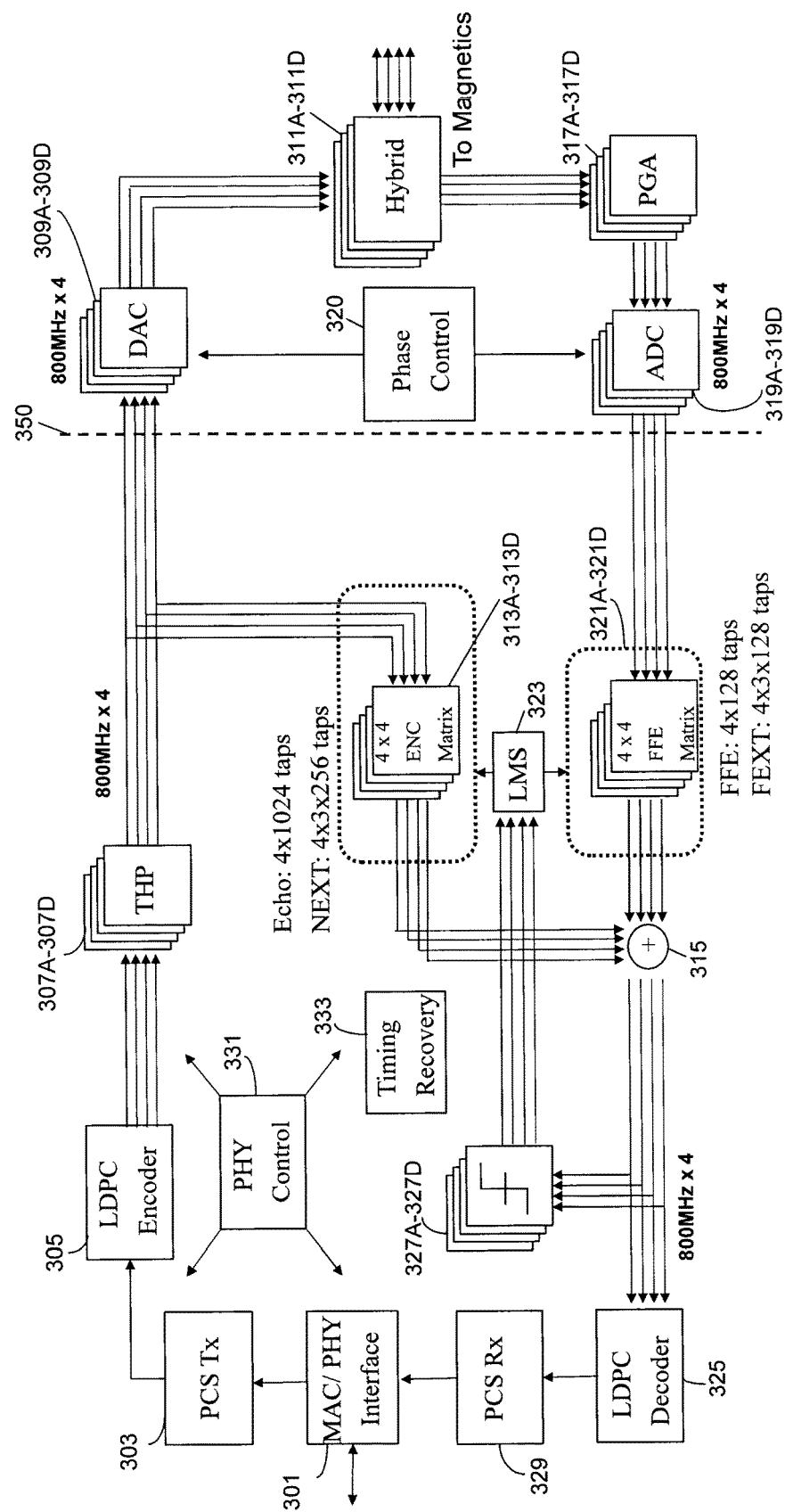
FIG. 3 depicts according to an embodiment, an exemplary transceiver used in the first representative communication system.

FIG. 3 depicts according to an embodiment, an exemplary transceiver used in the first representative communication system 100 of FIG. 1. Specifically, FIG. 3 illustrates a 10 GBASE-T PHY operating over a 100 meter unshielded/shielded twisted pair (UTP/STP) cable. Note that PHY is an abbreviation for the physical layer of the OSI model and denotes the circuitry that is required to implement physical layer functions. Furthermore, although the transceiver depicted in FIG. 3 is embodied as a 10 GBASE-T transceiver, other types of transceivers are within the scope and spirit of the embodiments described herein.

As shown in FIG. 3, the transceiver includes a MAC/PHY interface unit 301. The interface unit 301 connects a media access control layer device to a physical medium such as an optical fiber or copper cable. The transceiver includes a physical coding sub-layer transmitter (PCS Tx) 303 that resides above the PHY 301 and provides an interface between a physical medium attachment (PMA) and media independent interface (MMI). The PCS transmitter 303 performs, among other functions, encoding, scrambling, alignment marker insertion, block symbol redistribution, block synchronization etc, of the incoming signal.

The signal from the PCS transmitter 303 is further processed by a low-density-parity-check (LDPC) encoder 305. The LDPC encoder 305 supports encoding of low-density parity check codes that are essentially linear error control codes with sparse parity check matrices and long block lengths. The LDPC encoder provisions for forward error correction and outputs four data streams, each having a symbol rate of 800 Mega-Bauds.

Each of the four data streams output from the LDPC encoder 305 is processed by a Tomlinson Harashima precoder (THP) 307A-307D, respectively. Each of the THP 307A-307D pre-compensates the digital signal for linear impairments. The four data streams (signals) output from the THP pre-coders 307A-307D are further processed by four digital-to-analog (DAC) converters 309A-309D that each operate at 800 MHz. Upon performing the conversion to the analog domain, the four signals are passed to hybrid circuits (i.e., impedance matching circuits) 311A-311D to be transmitted on four TWPs as shown in FIG. 1.

Analog signals intended for the transceiver (i.e. incoming signals) are received by the hybrid circuits 311A-311D. Each of the hybrid circuit is configured to separate the incoming signal from the outgoing signal on each TWP. Each of the four signals received by the four hybrid circuits 311A-311D, respectively, are transferred to four programmable gain amplifiers (PGAs) 317A-317D. The programmable gain amplifiers are electronic amplifiers whose gain can be controlled by external voltage or current sources. Each of the programmable gain amplifiers 317A-317D, adjusts the level of the analog signal that is input to a corresponding analog to digital converter (319A-319D), in order to achieve a rated precision of the analog-to-digital converter that operates at 800 MHz.

Upon being converted into the digital domain, each of the four signals from the analog-to-digital converters 319A-319D are transferred to a 4×4 matrix of feed-forward equalizers (FFE) 321A-321D. According to one embodiment, the FFEs act as a finite impulse response filter and are configured to equalize the channel inter-symbol interference (ISI) and remove the far-end crosstalk interference component. The 4×4 matrix of FFEs include 4×128 coefficient taps in order to provide feed forward equalization and 4×3×128 taps to correct the far end crosstalk interference component.

In a similar fashion, the interference components of near-end echo and near-end crosstalk are removed by obtaining a portion of the signal to be transmitted (from the output of the THP encoders 307A-307D) and passing the signals through a 4×4 matrix of echo and near-end crosstalk (ENC) equalizers 313A-313D. The ENC equalizers 313A-313D include 4×1024 taps to provide echo cancellation and 4×3×256 taps to provide near-end crosstalk cancellation.

The output of the ENC equalizers 313A-313D is added to the output of the FFE equalizers 321A-321D by an adder 315 and further passed to the LDPC decoder 325 for correcting the channel errors. Each of the four signals entering the LDPC decoder operates at a baud-rate of 800 MHz. The signals from the adder 315 that are input to the LDPC decoder are also passed through a bank of slicers (one for each signal) 327A-327D. According to one embodiment, the slicers are hard decision slicers (i.e., decision devices that respond to the received signal at its input, and output the projection of the nearest symbol value). The slicers provide error estimates for driving a least mean square update unit 323 which in turn drives the ENC 313A-313D and FFE units 321A-321D, respectively.

The LDPC decoder 325 decodes the incoming signal and passes the signal to a physical coding sublayer receiver (PCS Rx) 329. The PCS Rx performs functions, among others, of further decoding, descrambling, alignment-marker removal or the like and passes the signal to the MAC/PHY interface 301. The PHY/control unit 331 controls the overall start-up sequences and data mode operations of the various units (including a timing recovery unit 333) depicted in FIG. 3.

Note that the functional blocks in FIG. 3 that are depicted to the left of the dotted line 350 correspond to the digital signal processing circuitry portions of the transceiver, whereas the blocks depicted to the right of the dotted line 350 constitute the AFE of the transceiver. The phase control unit 320 in the AFE of the transceiver controls the sampling phase of the input signals to the ADCs and DACs. Thus, the DACs (309A-309D), ADCs (319A-319D), hybrid circuits (311A-311D), PGAs (317A-317D) and phase control unit 320 correspond to analog front end (AFE) of the transceiver.

Figure 4:
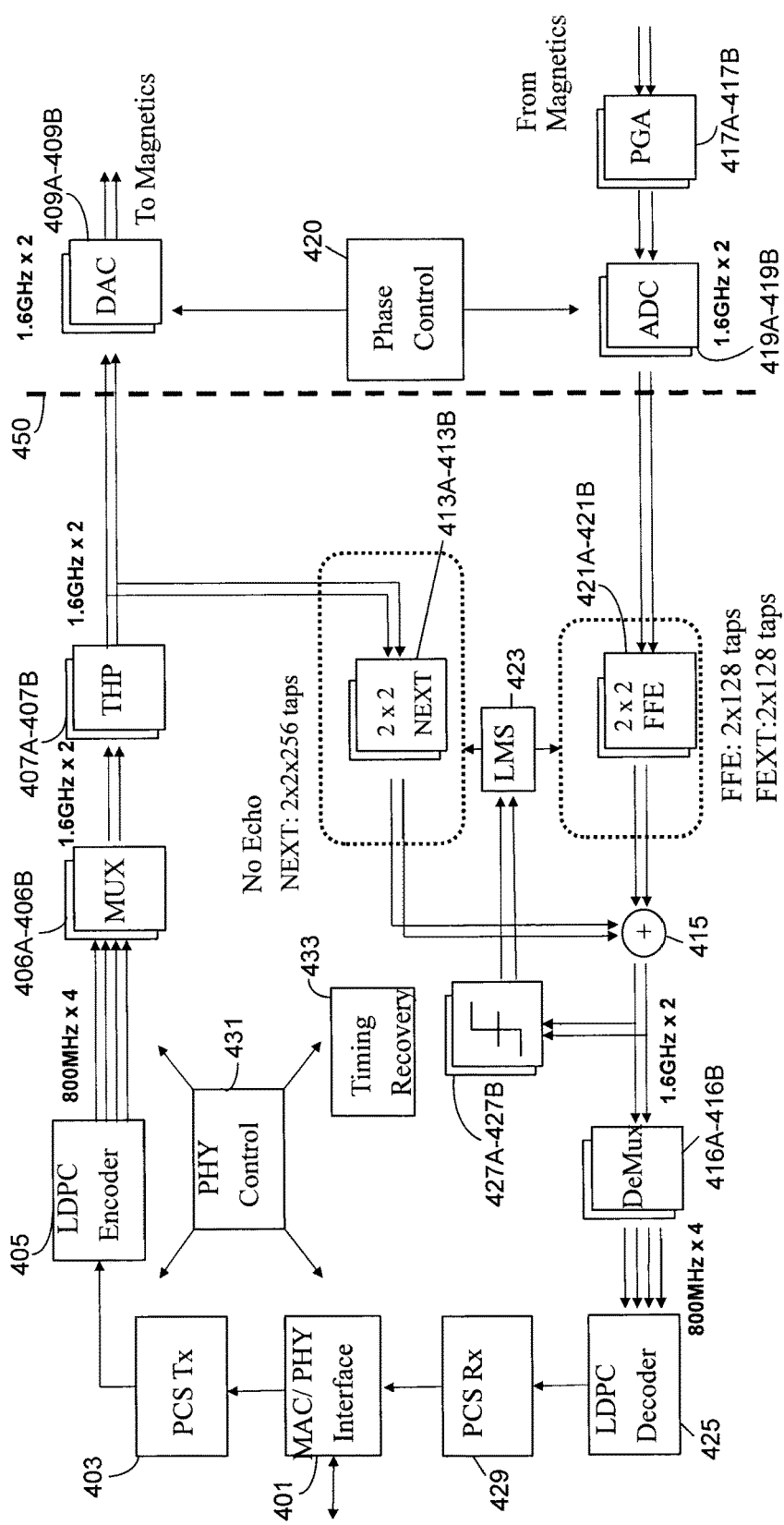
FIG. 4 depicts according to an embodiment, an exemplary transceiver used in the second representative communication system.

FIG. 4 depicts according to an embodiment, an exemplary transceiver used in the second representative communication system 200 of FIG. 2. The transceiver depicted in FIG. 4 is referred to herein as a 2Tx-2Rx transceiver that operates over a 30 meter shielded or unshielded twisted pair. Specifically, for the transceiver depicted in FIG. 4, two TWPs are configured only for transmission purposes and two TWPs are configured only for reception purposes. In doing so, the transceiver of FIG. 4 incurs the advantageous ability of eliminating hybrid circuits and echo cancellers. Thus, compared to the transceiver of FIG. 3, the complexity of the AFE (depicted to the right of the dotted line 450 in FIG. 4) is considerably reduced. Furthermore, as described below, the number of DACs and ADCs required for operation of the transceiver are also reduced, which leads to further reduction in the complexity as well as power consumption of the transceiver.

In what follows, a detailed description of the distinguishing characteristics of the 2Tx-2Rx transceiver of FIG. 4, as compared to the 10 GBASE-T transceiver of FIG. 3 is provided. Initially, it must be appreciated that the 2Tx-2Rx transceiver depicted in FIG. 4 can be substantially embodied in a similar hardware as that of the 10 GBASE-T transceiver depicted in FIG. 3. For instance, the 2Tx-2Rx transceiver includes the functional blocks MAC/PHY interface 401, PCS Tx 403, PCS Rx 429, LDPC encoder 405, LDPC decoder 425, PHY/control 431, and timing recovery unit 433, which are similar to the corresponding blocks described with reference to FIG. 3. Thus, for the sake of repetitiveness, a description of these blocks is avoided herein.

The 2Tx-2Rx transceiver of FIG. 4 includes two multiplexers 406A and 406B. Each of the two multiplexers 406A and 406B combines two data streams of 800 MHz that are output from the LDPC encoder 405, into two data streams of 1.6 GHz. The two data streams output from multiplexers 406A and 406B are respectively processed by two THP pre-coders 407A and 407B. Further, the data streams output from the THP pre-coders are transmitted to two digital-to-analog converters 409A and 409B, each operating at 1.6 GHz, to be transmitted directly (i.e., without the requirement for hybrid circuits) to the corresponding TWPs. Note that hybrid circuits are not required in the AFE of the transceiver of FIG. 4, as the transmit and receive signals are operated on separate twisted pairs. Furthermore, due to the above described configuration, only two near-end crosstalk cancellers 413A and 413B are required, which include 2×2×256 taps that enable cancelling the near end crosstalk interference component. Additionally, due to the absence of the near-end echo component, the transceiver of FIG. 4 does not require any circuitry to cancel the near-end echo.

In a similar fashion, two data streams are received via two TWPs that are dedicated for reception purposes. The received data streams are processed by two programmable gain amplifiers 417A and 417B and passed to two analog-to-digital converters 419A and 419B. The data streams are further processed by the 2×2 feed-forward equalizers 421A and 421B that include 2×128 taps to provide feed forward equalization and 2×128 taps for cancelling the far-end crosstalk interference component. The signals from the near-end crosstalk cancellers (413A and 413B) and the feed-forward equalizers (421A and 421B) are added by the adder 415. The data streams (each of rate 1.6 GHz) output by the adder 415 are processed by two de-multiplexers 416A and 416B, respectively. Each of the de-multiplexer splits the 1.6 GHz input data stream into two 800 MBaud data stream that is compatible with the 10 GBASE-T LDPC encoder 425. The received signals are further processed by the PCS receiver 429 and passed to the MAC/PHY interface 401. Furthermore, the transceiver depicted in FIG. 4 also includes a phase control unit 420, two signal slicers 427A and 427B, and a least means square update unit 423 that operate in a manner similar to that as described with reference to FIG. 3.

In addition to the embodiment as illustrated in FIG. 4, wherein two twisted pairs are configured for transmission and two twisted pairs are configured for reception, alternate configurations are within the scope and spirit of the embodiments. For instance, one twisted pair may be relied upon for transmission and one twisted pair relied upon for reception. In this case, the baud-rate may be increased to 3.2 GHz. Such an increase in the baud-rate may be accompanied by an alternate or varied AFE design, wider cable, and/or connector bandwidths.

As another alternative, a time-division multiplex approach may also be relied upon. For example, the twisted pair in a cable may be generally dedicated for transmission (although capable of reception). One or more events may be negotiated in the system to trigger when the transmission-dedicated twisted pair are to be operated in a receive mode of operation. In this case, each twisted pair may be capable of a near-maximum transmission throughput capacity, while permitting a negotiated time period for reception. In this case, for example, a 17 gigabit/sec downstream channel may be supported, with a 2 gigabit/sec interleaved upstream channel supported in parallel.

Figure 5:
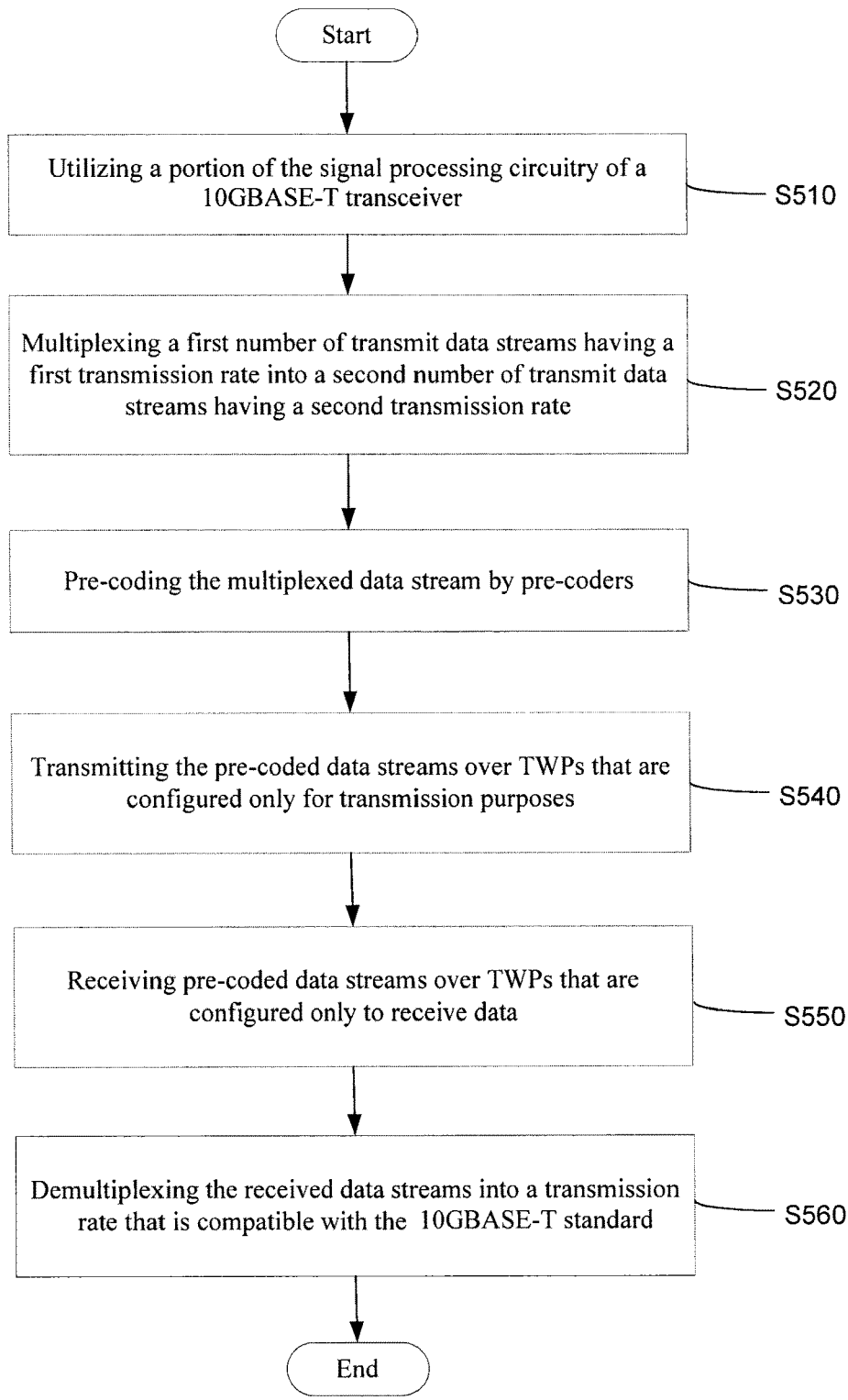
FIG. 5 depicts according to one embodiment, a flowchart for a method of reducing the overall power consumption and complexity of a transceiver used for transmitting Ethernet frames over short reach cables.

FIG. 5 depicts according to one embodiment, a flowchart for a method of reducing the overall power consumption and complexity of a transceiver. According to one embodiment, the transceiver can transmit/receive 10 Gbps Ethernet frames. As described previously, a transceiver employing such a method can be substantially embodied in a similar hardware configuration as that of a 10 GBASE-T transceiver and thus incur the advantageous ability of considerably reducing the complexity of the AFE of the transceiver.

In step S510, the transceiver utilizes a portion of the signal processing circuitry of a 10 GBASE-T transceiver. For instance, according to one embodiment, the transceiver could utilize the MAC/PHY interface, PCS transmitter, PCS receiver, LDPC encoder and the LDPC decoder of a 10 GBASE-T transceiver. It must be appreciated that the transceiver is not restricted to utilize portions of the signal processing circuitry only from the 10 GBASE-T transceiver. Rather, the transceiver of the present disclosure could utilize any MAC/PHY interface, PCS transmitter/receiver, and LDPC encoders/decoders.

In step S520, the transceiver multiplexes via multiplexers, a first number of transmit data streams (having a first transmission rate) into a second number of transmit data streams having a second transmission rate. For instance, according to one embodiment, four 10 GBASE-T transmit data streams (each of 800 MHz) can be multiplexed by two multiplexers to form two data streams, each having a transmission rate of 1.6 GHz The process then proceeds to step S530, wherein each multiplexed transmit stream is pre-coded by a pre-coder. For instance, according to one embodiment, the multiplexed transmit streams are pre-coded by a Tomlinson Harashima pre-coder (THP) to compensate for linear impairments.

In step S540, each pre-coded transmit stream is transmitted over a TWP that is configured for transmission purposes only. Specifically, the TWPs that are used by the transceiver for transmission purposes are not configured to receive any data streams that are intended for the transceiver. In other words, each TWP is configured to transmit data streams only in one direction. In step 540, the two multiplexed data streams of 1.6 GHz can be transmitted via two TWPs by the transceiver.

The process in step S550 receives pre-coded data streams over TWPs that are configured only reception purposes. In other words, the TWPs that are configured by the transceiver to receive data streams cannot be utilized by the transceiver for transmission purposes. The process then moves to step S560, wherein the received data streams are de-multiplexed by de-multiplexers into data streams that are compatible with the 10 GBASE-T standard. For instance, according to an embodiment, the transceiver may receive two 1.6 GHz pre-coded streams and de-multiplex the two streams into four streams of 800 MHz. Upon demultiplexing the data streams that are compatible with the 10 GBASE-T standard, the process in FIG. 5 terminates.

According to an embodiment of the present disclosure, lay restricting TWPs to either only transmit data streams or only receive data streams, the complexity of the AFE of the transceiver can be considerably reduced. The reduction in the complexity of the AFE results in lowering the overall power consumption (and cost) of the transceiver. Table I depicts a comparison of the AFE for a 10 GBASE-T transceiver and a 2Tx-2Rx transmitter of the present disclosure for different lengths of cables.

TABLE I

Comparison of Analog Front End

| | DACs | ADCs | Baud-rate | PGA | Hybrid | Tx BW (MHz) | PGA BW (MHz) |
|---|---|---|---|---|---|---|---|
| 10GBASE-T 100 m | 4 | 4 | 800 MHz | 4 | 4 | 400 | 250 |
| 2Tx + 2Rx 10 m | 2 | 2 | 1.6 GHz | 2 | 0 | 800 | 500 |
| 2Tx + 2Rx 30 m | 2 | 2 | 1.6 GHz | 2 | 0 | 800 | 500 |

Table I compares the number of DACs, number of ADCs, number of PGAs, number of hybrid circuits, and the achievable Baud-rate for the 10 GBASE-T and the 2Tx-2Rx transceiver.

As depicted in Table I, the 10 GBASE-T transceiver requires four DACs and four ADCs. In contrast, the 2Tx-2Rx transceiver requires only two ADCs and two DACs for short reach cables (10 m, 30 m), as it multiplexes/demultiplexes data streams and performs communication by transmitting/receiving the data streams on TWPs that are configured to transmit signals only in one direction. Furthermore, since the transmission and reception of data streams is performed on separate TWPs in the 2Tx-2Rx transceiver, it requires no hybrid circuits compared to four hybrid circuits (one for each TWP) required by the 10 GBASE-T transceiver.

Table II depicts a comparison of the number of filters required in the feed-forward equalizers and the echo and near-end crosstalk (ENC) equalizers by the 10 GBASE-T transceiver and the 2Tx-2Rx transceiver employing unshielded Twisted Pair (UTP) cables. The filters depicted in Table II are: echo cancellers (EC), feed-forward equalizers (FFE), near-end crosstalk filters (NXT), and far-end crosstalk filters (FXT).

As stated previously and in contrast to the 10 GBASE-T transceiver, since the 2Tx-2Rx transceiver configures the TWPs to transmit signals only in one direction, the 2Tx-2Rx transceiver does not require any echo cancellers. Furthermore, the number of FFE, NXT and FXT filters required by the 2Tx-2Rx transceiver are lower than the number of corresponding filters required by the 10 GBASE-T transceiver.

Table II also depicts the filter complexity of the 10 GBASE-T transceiver and the 2Tx-2Rx transceiver. The filter complexity of transceivers is computed as follows:

$$\text{Complexity} = \left( \frac{(EC \text{ size}) * (\#EC) + (FFE \text{ size}) * (\#FFE) +}{NF} \frac{(NXT \text{ size}) * (\#NXT) + (FXT \text{ size}) * (\#FXT)}{NF} \right) * T \quad (1)$$

wherein NF corresponds to a normalizing factor equal to 128 and the parameter T corresponds to the throughput. Thus, it can be observed that the complexity of the 2Tx-2Rx transceiver is considerably lower than the complexity of the 10 GBASE-T transceiver.

The above descriptions include descriptions of algorithmic flowcharts illustrating process steps. These flowcharts are exemplary and the process steps depicted therein may be performed in an order different from the order depicted in the figures. For example, the process steps may be performed in sequential, parallel or reverse order without departing from the scope of the present disclosure. Also, the above descriptions are organized as separate embodiments for ease of understanding of the inventive concepts described. However, one of ordinary skill in the art will recognize that the features of one embodiment may be combined with those of another without departing from the scope of the disclosure. Thus, the particular combination of features described in each of the embodiments is merely exemplary and may be combined without limitation to form additional embodiments without departing from the scope of the disclosure.

Obviously, numerous modifications and variations of the present invention are possible in light of the above teachings. It is therefore to be understood that within the scope of the appended claims, the invention may be practiced otherwise than as specifically described herein.

TABLE II

Comparison of number of FFE/ENC filters for Unshielded Twisted Pair (UTP) cables.

| | Size of Filters | | | | Number of Filters | | | | | |
|---|---|---|---|---|---|---|---|---|---|---|
| | EC size | FFE size | NXT size | FXT size | # EC | # FFE | # NXT | # FXT | Throughput (T) | Complexity |
| 10GBASE-T 100 m UTP | 1024 | 128 | 256 | 128 | 4 | 4 | 12 | 12 | 1x | 72x |
| 2Tx + 2Rx 10m UTP | 0 | 128 | 256 | 128 | 0 | 2 | 4 | 2 | 2x | 24x |
| 2Tx + 2Rx 30 m UTP | 0 | 128 | 256 | 128 | 0 | 2 | 4 | 2 | 2x | 24x |

The invention claimed is:

1. A communication transceiver comprising:
an analog front end configured to communicate, without a hybrid circuit, over at least one twisted pair that is only for transmitting data streams, and communicate, without the hybrid circuit, over at least one twisted pair that is only for receiving data streams; and
circuitry configured to
encode an input data stream to generate a first number of data streams,
multiplex the generated first number of data streams having a first transmission rate into a second number of data streams having a second transmission rate higher than the first transmission rate,
pre-code the multiplexed second number of data streams to be communicated via the at least one twisted pair that is only for transmitting data streams by the analog front end,
convert the pre-coded multiplexed second number of data streams into analog transmission signals,
transmit the analog transmission signals via the at least one twisted pair that is only for transmitting data streams,
convert a plurality of received signals received via the at least one twisted pair that is only for receiving data streams into digital data streams, and
control a sampling phase of the conversion of pre-coded multiplexed second number of data streams into the analog transmission signals and a sampling phase of the conversion of the plurality of received signals received via the at least one twisted pair that is only for receiving data streams into the digital data streams.

2. The communication transceiver of claim 1, wherein the circuitry is further configured to perform physical coding sublayer (PCS) encoding, PCS decoding, and low-density parity check (LPDC) forward error correction that is consistent with a 10 GBASE-T transceiver.

3. The communication transceiver of claim 2, wherein the first transmission rate is equal to the transmission rate of a 10 GBASE-T transceiver.

4. The communication transceiver of claim 3, wherein the circuitry is configured to perform pre-coding of the multiplexed data streams to compensate for linear impairments.

5. The communication transceiver of claim 3, wherein the first number of data streams are four, the first transmission rate is 800 MHz, the second number of transmission data streams are two and the second transmission rate is 1.6 GHz.

6. The communication transceiver of claim 1, wherein the analog front end is configured to communicate over two twisted pairs for transmission and two twisted pairs for reception.

7. The communication transceiver of claim 1, wherein the analog front end does not include any echo-cancellers.

8. The communication transceiver of claim 2, wherein the analog front end is further configured to communicate over at least one twisted pair for reception and transmission in a time-division multiplexing fashion.

9. A communication system comprising:
a first transceiver and a second transceiver connected by a short reach cable that includes a plurality of twisted pairs;
a first analog front end included in the first transceiver and configured to communicate without a hybrid circuit and with a second analog front end included in the second transceiver over at least one twisted pair that is only for transmitting data streams, and communicate without the hybrid circuit over at least one twisted pair that is only for receiving data streams; and
a first circuitry included in the first transceiver and a second circuitry included in the second transceiver, the first circuitry and the second circuitry being respectively configured to
encode an input data stream to generate a first number of data streams,
multiplex the generated first number of data streams having a first transmission rate into a second number of data streams having a second transmission rate higher than the first transmission rate,
pre-code the multiplexed second number of data streams to be communicated via the one twisted pair that is only for transmitting data streams by the respective analog front end,
convert the pre-coded multiplexed second number of data streams into analog transmission signals,
transmit the analog transmission signals via the at least one twisted pair that is only for transmitting data streams,
convert a plurality of received signals received via the at least one twisted pair that is only for receiving data streams into digital data streams, and
control a sampling phase of the conversion of pre-coded multiplexed second number of data streams into the analog transmission signals and a sampling phase of the conversion of the plurality of received signals received via the at least one twisted pair that is only for receiving data streams into the digital data streams.

10. The communication system of claim 9, wherein the first and second circuitry are further configured to perform physical coding sublayer (PCS) encoding, PCS decoding, and low-density parity check (LPDC) forward error correction that is consistent with a 10 GBASE-T transceiver.

11. The communication system of claim 10, wherein the first circuitry and the second circuitry respectively multiplex the first number of data streams having a first transmission rate into the second number of data streams having a second transmission rate, the first transmission rate being equal to the transmission rate of a 10 GBASE-T transceiver.

12. The communication system of claim 11, wherein first circuitry and the second circuitry are configured to perform pre-coding of the multiplexed data streams to compensate for linear impairments.

13. The communication system of claim 11, wherein the first number of data streams are four, the first transmission rate is 800 MHz, the second number of transmission data streams are two and the second transmission rate is 1.6 GHz.

14. The communication system of claim 9, wherein the first analog front end is configured to communicate with the second analog front end over two twisted pairs for transmission and two twisted pairs for reception.

15. The communication system of claim 9, wherein the first analog front end and the second analog front end do not include any echo-cancellers.

16. The communication system of claim 9, wherein the short reach cable is one of a shielded cable and an unshielded cable and has a length of 30 meters.

17. A method for reducing overall power consumption and complexity of a transceiver that operates over a short reach cable, the method comprising:
communicating, by an analog front end and without a hybrid circuit, over at least one twisted pair that is only for transmitting data streams, and communicating, without the hybrid circuit, over at least one twisted pair that is only for receiving data streams;

encoding by circuitry, an input data stream to generate a first number of data streams;

multiplexing the generated first number of data having a first transmission rate into a second number of data streams having a second transmission rate higher than the first transmission rate;

pre-coding the multiplexed second number of data streams to be communicated via the at least one twisted pair that is only for transmitting data streams by the analog front end;

converting the pre-coded multiplexed second number of data streams into analog transmission signals;

transmitting the analog transmission signals via the at least one twisted pair that is only for transmitting data streams;

converting a plurality of received signals received via the at least one twisted pair that is only for receiving data streams into digital data streams; and controlling a sampling phase of the conversion of pre-coded multiplexed second number of data streams into the analog transmission signals and a sampling phase of the conversion of the plurality of received signals received via the at least one twisted pair that is only for receiving data streams into the digital data streams.

18. The method of claim 17, further comprising: performing by the circuitry, physical coding sublayer (PCS) encoding, PCS decoding, and low-density parity check (LPDC) forward error correction that is consistent with a 10 GBASE-T transceiver.

19. The method of claim 17, wherein the first number of data streams having a first transmission rate are multiplexed into a second number of data streams having a second transmission rate, the first transmission rate being equal to the transmission rate of a 10 GBASE-T transceiver.

20. The method of claim 17, wherein the analog front end does not include any echo-cancellers.

21. The communication transceiver of claim 1, wherein the pre-coded data streams have a transmission rate equal to the transmission rate of the multiplexed data streams.

* * * * *